United States Patent [19]

DeVit et al.

[11] Patent Number: 4,924,681
[45] Date of Patent: May 15, 1990

[54] COMBINED HEAT PUMP AND DOMESTIC WATER HEATING CIRCUIT

[75] Inventors: Martin B. DeVit, 30 Marian Ave., Glens Falls, N.Y. 12803; Jeffrey C. Shannon, Gansevoort, N.Y.

[73] Assignee: Martin B. DeVit, Glen Falls, N.Y.

[21] Appl. No.: 354,901

[22] Filed: May 18, 1989

[51] Int. Cl.$^5$ .............................. F25B 27/00
[52] U.S. Cl. .................... 62/238.6; 62/248.7
[58] Field of Search ........... 62/238.6, 238.7, 324.4, 62/160

[56] References Cited

U.S. PATENT DOCUMENTS

| | | | |
|---|---|---|---|
| 2,900,805 | 8/1959 | Tilney . | |
| 3,246,482 | 4/1966 | Harnish | 62/324.1 |
| 3,916,638 | 11/1975 | Schmidt | 62/238.6 |
| 4,249,390 | 2/1981 | Jones | 62/238.6 |
| 4,255,939 | 3/1981 | Ou | 62/324.1 |
| 4,299,098 | 11/1981 | Derosier | 62/238.6 |
| 4,306,421 | 12/1981 | Gucwa, Jr. et al. | 62/324.1 |
| 4,311,498 | 1/1982 | Miller | 62/181 |
| 4,399,664 | 8/1983 | Derosier | 62/238.7 |
| 4,528,822 | 7/1985 | Glamm | 62/238.7 |
| 4,545,214 | 10/1985 | Kinoshita | 62/160 |
| 4,563,879 | 1/1986 | Hama et al. | 62/160 |
| 4,646,537 | 3/1987 | Crawford | 62/238.6 |
| 4,718,248 | 1/1988 | Fisher | 62/238.7 |

OTHER PUBLICATIONS

Thermal Associates—Waterfurnace TF Series Refrigerant Circuit; Dialog Information Services, Inc.—Dialog File 6: NTIS.

*Primary Examiner*—Lloyd L. King
*Attorney, Agent, or Firm*—Nixon & Vanderhye

[57] ABSTRACT

A refrigeration circuit is provided for use in a combined water heating, space heating and cooling system which includes a three way diverter valve and a four way reversing valve controlled to direct refrigerant flow in six modes: to heat a space; cool a space; heat a space and heat water by desuperheating refrigerant vapor; cool a space and heat water by desuperheating refrigerant vapor; heat water as a priority without affecting space temperature; and simultaneously heat water by condensation of refrigerant vapor while cooling a space.

32 Claims, 5 Drawing Sheets

COMBINED HEAT PUMP AND DOMESTIC WATER HEATING CIRCUIT

BACKGROUND AND SUMMARY OF THE INVENTION

This invention relates broadly to the field of domestic water heating and domestic space heating and cooling. More specifically, the invention relates to an improved refrigeration circuit which is operative in various modes to heat a space; cool a space; heat domestic water as a priority without affecting space temperature; simultaneously heat domestic water and cool a space by desuperheating refrigerant vapor; and simultaneously heat domestic water and heat a space by desuperheating refrigerant vapor. In an alternative mode, the refrigeration circuit of this invention allows simultaneous heating of water and cooling a space by condensing refrigerant vapor.

It is, of course, known in the art to provide reversible heat pumps for heating or cooling air ducted to an interior space. It has also been proposed to combine the heating/cooling of air with domestic water heating in a single system. See, for example, U.S. Pat. No. 4,249,390 which provides for the heating of water while cooling a space, and heating of water while heating a space.

In U.S. Pat. No. 3,916,638, a heat pump is disclosed which may be used to cool a space, or to heat domestic water while cooling a space.

In U.S. Pat. No. 4,299,098, a refrigeration circuit is disclosed which is designed for operation in four modes: heating a space; cooling a space, heating water without affecting space temperature; and simultaneously heating water while cooling a space.

In U.S. Pat. No. 4,399,664, a refrigeration circuit is disclosed which adds a fifth function to those which are disclosed in U.S. Pat. No. 4,299,098, i.e., simultaneously heating water while heating a space.

The present invention relates to a refrigeration circuit which has five similar modes of operation, i.e., heating a space; cooling a space; heating water without affecting space temperature; simultaneously heating water while cooling a space; and simultaneously heating water while heating a space. In the present invention, however, an improved refrigeration circuit is provided which minimizes valving, refrigerant storage vessels, and associated controls necessary to obtain proper refrigerant control.

Thus, in one exemplary embodiment of the invention, a refrigeration circuit is provided which includes a conventional compressor which discharges refrigerant vapor to a conventional domestic water desuperheater/condenser. A three-way diverter valve lies downstream of the desuperheater/condenser, one port of which directs flow to a four way reversing valve. Both the diverter valve and reversing valve may be operated by conventional control means. The reversing valve is operative to direct refrigerant vapor flow to either an indoor evaporator/condenser unit or an outdoor evaporator/condenser unit (both of which may be of conventional construction) depending on operating mode. The indoor and outdoor evaporator/condenser units are also connected by a conduit which incorporates two pairs of restrictors or capillary tubes, one pair associated with each unit. Depending on operating mode, refrigerant will flow through one or both tubes of one or the other pairs of tubes via a suitable conduit arrangement. In addition, a pair of check valves are provided, one each of which is associated with the indoor evaporator/condenser and outdoor evaporator/condenser for bypassing the restrictors whenever refrigerant flow is in a direction out the indoor or outdoor evaporator/condenser units.

Refrigerant vapor from either the indoor evaporator/condenser or from the outdoor evaporator/condenser is returnable to the compressor by way of the reversing valve, a compressor suction conduit, an accumulator, and a pair of liquid conduit/suction conduit heat exchangers.

In an exemplary embodiment of the invention, domestic water may be diverted into and out of the desuperheater/condenser when it is desired to heat the water. The controls for so directing the domestic water supply are conventional and need not be described in detail.

It will further be appreciated that the refrigeration circuit of this invention may be employed to heat liquids other than domestic water, and in environments other than the domestic, or home, system described in detail herein.

In a first mode, for heating a space, no water is diverted into the desuperheater/condenser, and hot refrigerant vapor discharged through the domestic water desuperheater/condenser is diverted by the diverter valve to the reversing valve. The reversing valve directs the refrigerant flow to the indoor evaporator/condenser where the refrigerant vapor is condensed and heat is rejected to the space. The condensed (liquid) refrigerant then exits the indoor evaporator/condenser and flows through a first check valve to a first liquid conduit which incorporates a liquid conduit/suction conduit heat exchanger for subcooling of the liquid refrigerant. The liquid refrigerant then flows through one of the restrictors or capillary tubes and into the outdoor evaporator/condenser where the refrigerant liquid evaporates, absorbing heat. Refrigerant vapor exits the outdoor evaporator/condenser and flows back through the reversing valve to the compressor suction conduit and thereafter through the accumulator, first heat exchanger and finally, to the compressor.

In a second mode, where space is heated and domestic water is heated, the above-described flow path is utilized, but at the same time, water is passed through the desuperheater/condenser and is heated by desuperheating the refrigerant vapor.

In a third mode of operation, for cooling a space, again no water is diverted into the desuperheater/condenser. Hot refrigerant vapor discharged from the compressor passes through the water desuperheater/condenser to the diverter valve which directs the flow to the four way reversing valve which, in turn, directs the vapor to the outdoor condenser/evaporator. Refrigerant vapor here rejects heat to the air or to a water/ground sink and condenses. The refrigerant now in liquid form flows through a second check valve and through a liquid conduit, associated heat exchanger and through another of the restrictor or capillary tubes into the indoor evaporator/condenser, where the liquid evaporates, absorbing heat from the space. The refrigerant, which is now in cool vapor form, is then directed to the compressor suction conduit, through the accumulator, first heat exchanger and then finally to the compressor.

In a fourth, related mode, domestic water is heated while the space is cooled by diverting water through the desuperheater/condenser where, as in the second mode, refrigerant vapor is desuperheated, transferring excess heat to the water.

In a fifth mode, and upon a priority demand for domestic hot water, water may be heated without affecting the space temperature. When it is desired to heat the domestic water as a priority, appropriate and conventional controls are employed which permit heating of the water regardless of whether the system is otherwise operating in a heating or cooling mode, and without affecting space temperature. Thus, upon demand for domestic hot water, when the controls are otherwise in a space heating mode, the hot refrigerant vapor discharged by the compressor flows through the domestic water desuperheater/condenser where it is condensed, rejecting heat to the domestic water. The refrigerant is then directed to the diverter valve which directs the liquid refrigerant to the first liquid/suction heat exchanger where it is subcooled. The liquid then flows through a liquid conduit and the pair of series arranged restrictors or capillary tubes associated with the outdoor evaporator/condenser unit, and then into the outdoor evaporator/condenser where the refrigerant evaporates, absorbing heat. Refrigerant vapor then exits the outdoor evaporator/condenser and flows through the reversing valve and returns to the compressor via the accumulator and second liquid conduit/suction conduit heat exchanger. Excess liquid refrigerant is allowed to flow through the other set of restrictor tubes and into the indoor evaporator/condenser for temporary storage. As the demand for domestic hot water is satisfied, the diverter valve is reversed, returning the refrigerant circuit to the normal space heating mode and returning excess refrigerant stored in the indoor evaporator/condenser to the active refrigerant circuit.

Upon a priority demand for hot water when the controls are otherwise in a space cooling mode, the refrigerant flow circuit is as described immediately above with the understanding that as the demand for hot water is satisfied, the circuit is returned to a space cooling mode.

In a sixth and alternative operating mode, water is heated while the space is cooled, utilizing a flow path wherein the water is heated by refrigerant vapor condensation rather than desuperheating. Thus, refrigerant vapor from the compressor passes through the domestic water desuperheater/condenser where it is condensed and heat is rejected to the domestic water supply. The liquid is then diverted in the diverter valve to the second liquid conduit/suction conduit heat exchanger where it is subcooled. The liquid then flows through a liquid conduit and a pair of series arranged restrictor or capillary tubes associated with the indoor condenser/evaporator and then to the indoor condenser/evaporator unit itself. From the indoor evaporator/condenser, refrigerant vapor flows through a suction conduit to the compressor via the reversing valve, accumulator and second suction conduit/liquid conduit heat exchanger. In this mode of operation, excess liquid refrigerant is allowed to flow through liquid conduits to the outdoor condenser/evaporator where it is temporarily stored.

Additional objects and advantages of the present invention will become apparent from the detailed description of the accompanying drawings.

DETAILED DESCRIPTION OF THE DRAWINGS

Figure 1:
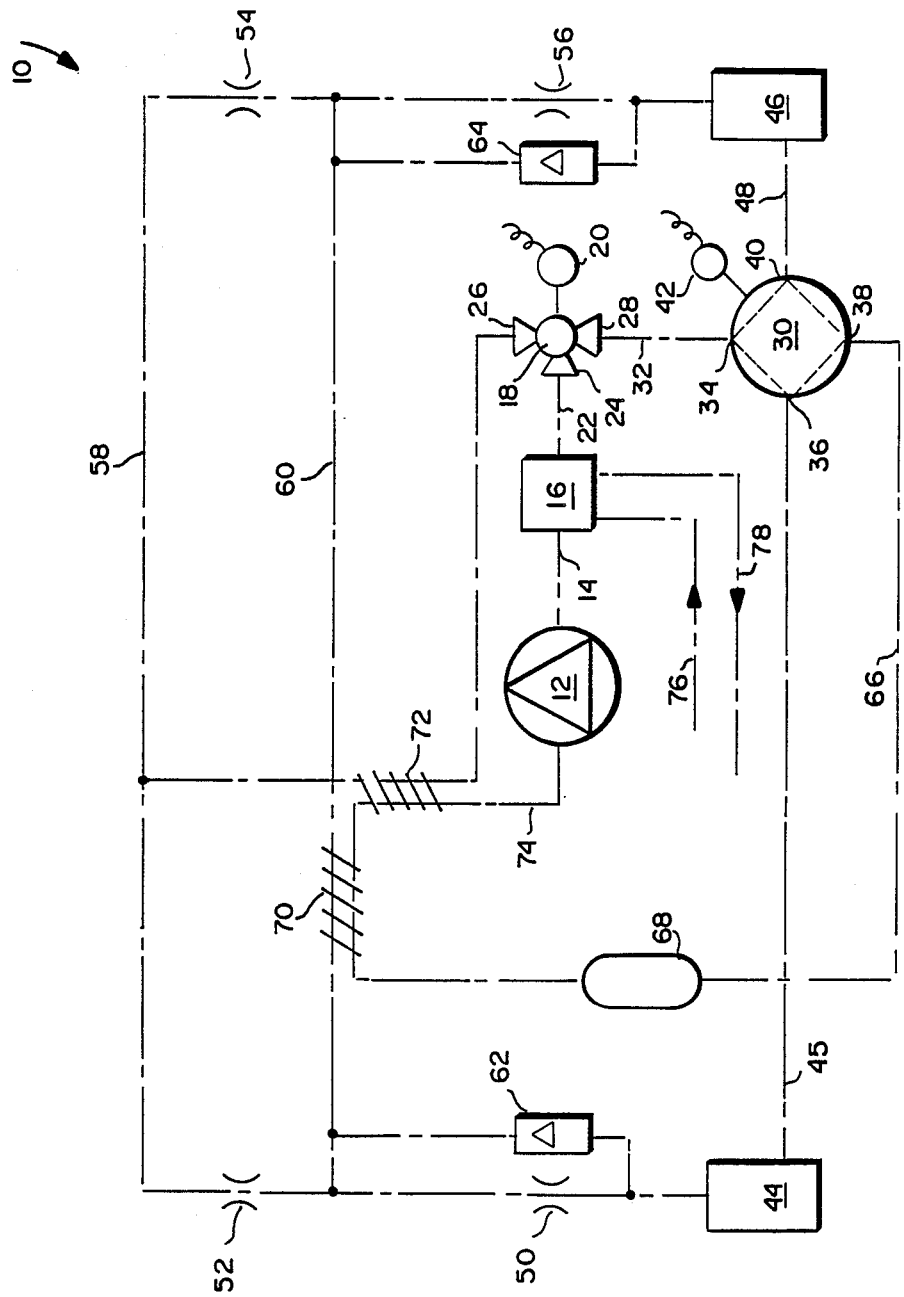
FIG. 1 is a schematic diagram of a refrigeration circuit in accordance with the exemplary embodiment of this invention.

Referring to FIG. 1, the refrigeration circuit 10 in accordance with this invention includes a compressor 12 having an inlet and an outlet, the latter connected to a gas discharge conduit 14 which feeds a domestic water desuperheater/condenser 16, also provided with an inlet and an outlet.

A three way diverter valve 18 and associated operator 20, lie downstream of the desuperheater/condenser 16, and the diverter valve is connected to the latter via a conduit 22. The diverter valve 18 may be a three-way pilot operated solenoid valve, or it may be comprised of a normally open valve and a normally closed valve, mounted with the valve inlets common to the conduit 22. This valve's operator 20 is controlled by domestic hot water demand with conventional electrical circuitry and devices, such as thermostats and refrigerant pressure controls (not shown). The diverter valve 18 has three ports, 24, 26 and 28, the latter port 28 arranged to direct flow to a reversing valve 30 via conduit 32. The reversing valve 30, in turn, has four ports 34, 36, 38 and 40, along with an associated operator 42 (which may also be of conventional construction).

The reversing valve 30 directs refrigerant to either of an indoor evaporator/condenser unit 44 via conduit 45, or outdoor evaporator/condenser unit 46 via conduit 48, depending on operating mode, as will be explained further below. Each of the units 44, 46 has a first and second flow connection associated therewith. The outdoor evaporator/condenser unit 46 may be a conventional air to refrigerant heat exchanger, or a liquid to refrigerant heat exchanger coupled to a liquid heat source/sink such as a ground loop or water reservoir. The indoor unit 44 may also be of conventional design.

The indoor and outdoor evaporator/condenser units 44, 46 are also connected by way of a conduit incorporating two pairs of associated restrictors, or capillary tubes 50, 52 and 54, 56, respectively. As will be described further hereinbelow, and again depending upon the selected operating mode, refrigerant will flow through one or both tubes of one or the other pair of tubes, via liquid conduits 58, 60.

A pair of check valves 62, 64 are also provided, the former being associated with the indoor evaporator/condenser 44, and the latter being associated with outdoor evaporator/condenser 46.

Refrigerant vapor from indoor evaporator/condenser 44 or from outdoor evaporator/condenser 46 is returnable to the compressor 12 via the reversing valve 30, a first compressor suction conduit 66, an accumulator 68 and a pair of liquid conduit/suction conduit heat exchangers 70, 72 (each having first and second conventional flow connections, not shown) located in a second compressor suction conduit 74.

A domestic water circuit, which may be of otherwise conventional design, is arranged to divert water into the desuperheater/condenser 16 via conduit 76, on demand by operation of suitable controls, and out of the desuperheater/condenser via conduit 78.

In use, the diverter valve 18 and reversing valve 30 are selectively positioned by operation of, for example, solenoid actuators, in response to user actuated controls, to direct water and/or refrigerant flow in one of six operating modes as will be described in more detail below.

It will be understood that all components utilized in the above described circuit are of conventional construction and are commercially available. The invention here relates not to the components, per se, but to the arrangement of such components in a circuit which minimizes valving, refrigerant storage vessels, and associated controls while permitting the above described heating/cooling functions.

The various modes of operation will now be described in detail.

Figure 2:
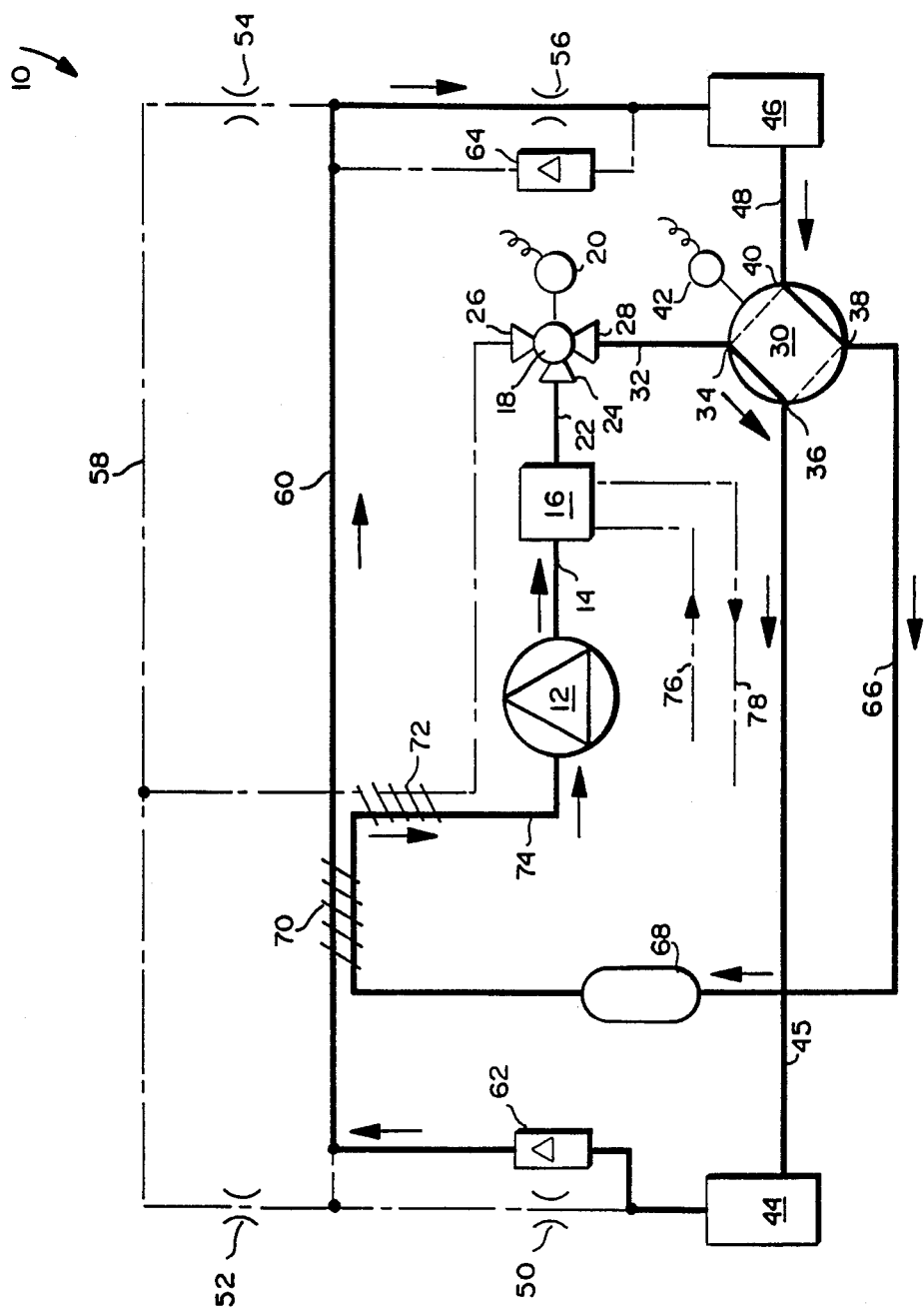
FIG. 2 is a schematic diagram of the circuit illustrated in FIG. 1 and wherein the flow of refrigerant in a space heating (and optional simultaneous water heating) mode is shown in solid lines.

In a first, or space heating mode, as illustrated in FIG. 2, no water is heated and, therefore, the domestic water is not permitted to flow through the desuperheater/condenser 16. Refrigerant vapor from compressor 12, discharged through the domestic water desuperheater/condenser 16, is diverted by the diverter valve 18, from port 24 to port 28, to the reversing valve 30. More specifically, the port or outlet 28 directs refrigerant flow to port 34 of the reversing valve 30, and from port 34 to port 36, and then, via conduit 45, to the first flow connection of the indoor evaporator/condenser unit 44 which operates as a condenser, so that heat is rejected to air flowing through the unit and circulated by a fan (not shown) in a conventional manner, to thereby heat the space.

Liquid refrigerant exits the indoor evaporator/condenser unit 44 via the second flow connection, and flows through the check valve 62 to the first liquid conduit 60, and including the liquid conduit/suction conduit heat exchanger 70, (or, alternatively, a liquid conduit/suction accumulator heat exchanger not shown) to subcool the liquid refrigerant. At the same time, harmful liquid in the suction vapor line can be reduced or eliminated (by subcooling the liquid refrigerant while warming superheated vapor in suction conduit 74) with the effect of increasing pumping capacity. Liquid refrigerant continues through the liquid conduit 60, and through the restrictor (capillary) tube 56 into the outdoor evaporator/condenser 46 via its first flow connection where the liquid refrigerant evaporates, absorbing heat. Refrigerant vapor exits the outdoor evaporator/condenser 46 via its second flow connection and flows through the reversing valve 30, from port 40 to port 38, to the compressor suction conduit 66. Thereafter, the refrigerant vapor flows through the accumulator 68, through first heat exchanger 70 and into the compressor 12.

To simultaneously heat the space as well as domestic water in a second mode, the refrigerant circuit illustrated in FIG. 2 is utilized, but domestic water is permitted to flow into the desuperheater/condenser 16 via conduit 76 so that heat is transferred to the water during desuperheating of the refrigerant vapor. The heated water is then directed out of the unit 16 via conduit 78 to the various points of use (not shown) or to a storage tank (not shown).

Figure 3:
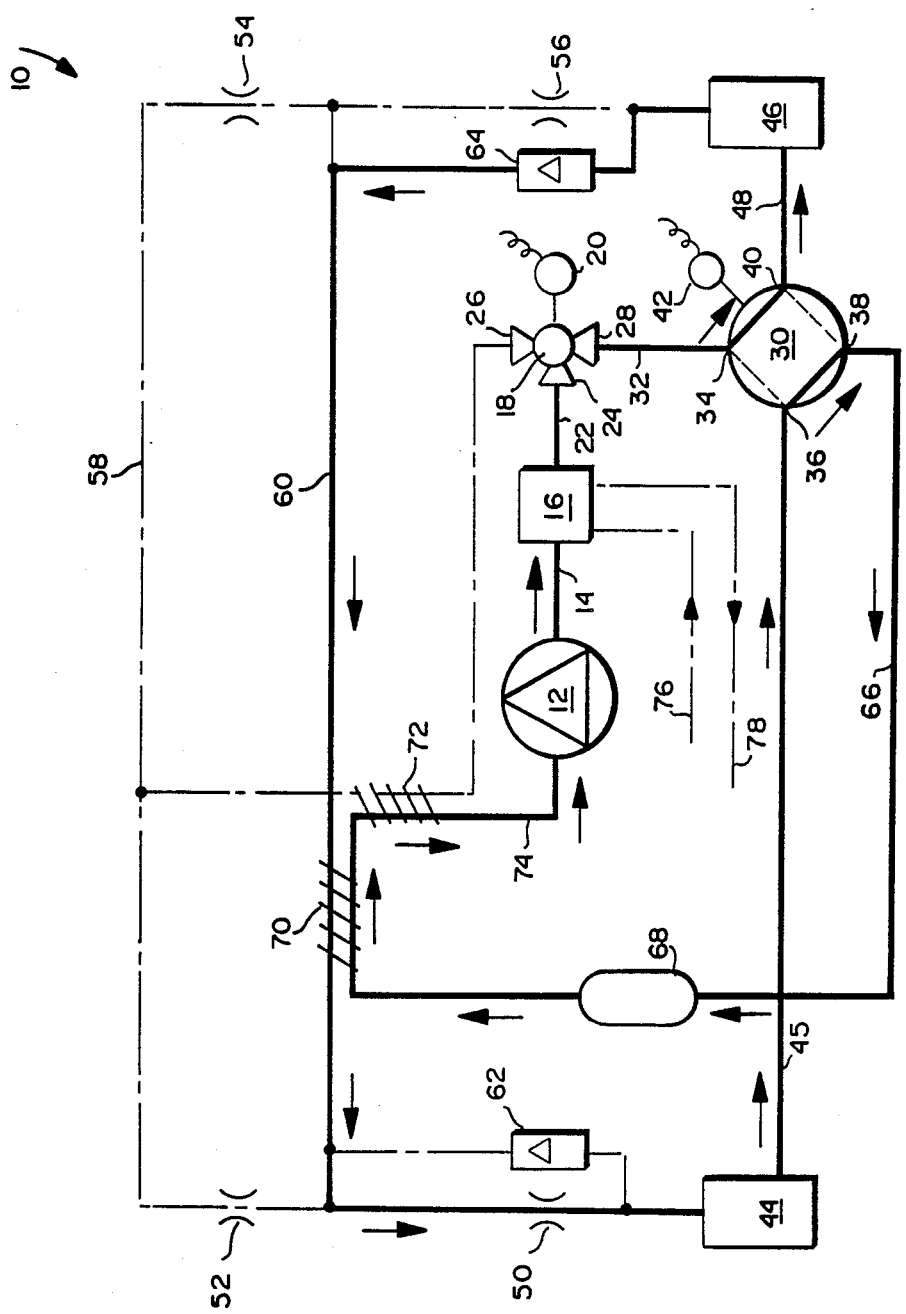
FIG. 3 is a schematic diagram of the refrigeration circuit illustrated in FIG. 1 and wherein the flow of refrigerant in a space cooling (and optional simultaneous water heating) mode is shown in solid lines.

Referring now to FIG. 3, the third, or space cooling mode, is generally similar to the space heating mode, but with opposite flow vis-a-vis the indoor and outdoor condenser/evaporators 44, 46, respectively. Here again, since domestic water is not heated in this mode, the water is not permitted to flow through the desuperheater/condenser 16. Thus, refrigerant vapor is directed from the compressor discharge conduit 22 through the diverter valve 18, from port 24 to port 28, and then to the reversing valve 30, from port 34 to port 40, so that the refrigerant vapor is directed to the outdoor condenser/evaporator 46, which operates as a condenser. Refrigerant vapor here rejects heat to the air or water/ground sink and condenses. The resulting refrigerant liquid thereafter flows through the check valve 64, and through the liquid conduit 60 and first liquid conduit/suction conduit heat exchanger 70. The vapor then flows through the restrictor (capillary) tube 50 and into the indoor evaporator/condenser 44, where it absorbs and evaporates, creating cooler air for circulation in the interior space. Refrigerant vapor flow is then directed through the conduit 45 and through the reversing valve 30, ports 38 to 36, into the suction conduit 66. The vapor then passes through accumulator 68 and first heat exchanger 70 via compressor suction conduit 74, finally returning to the compressor 12.

When it is desired to heat the domestic water while simultaneously cooling the space in a fourth mode, the refrigerant flow circuit illustrated in FIG. 3 is again utilized as hot water is diverted into and out of the desuperheater 16 via conduits 76, 78 to heat the water while desuperheating the refrigerant vapor.

Figure 4:
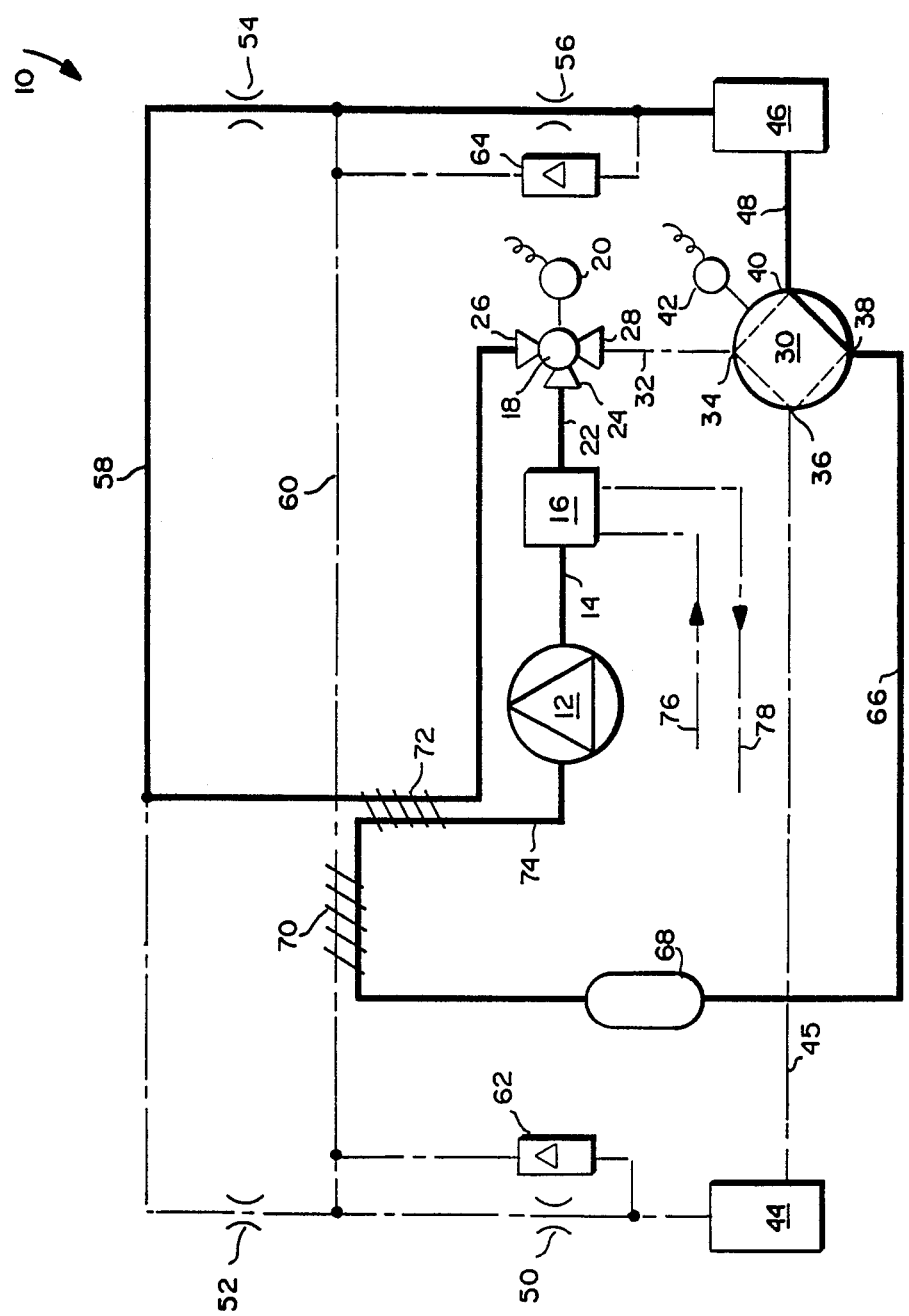
FIG. 4 is a schematic diagram of the refrigeration circuit illustrated in FIG. 1 and wherein the flow of refrigerant in a water heating priority mode (with controls otherwise set in a heating mode) is shown in solid lines.

In a fifth mode, and upon a priority demand for domestic hot water, the domestic water supply is permitted to flow through the desuperheater/condenser 16, but the refrigerant flow path is such that there is no effect on space temperature. As illustrated in FIG. 4, the controls and/or switches including thermostats, refrigerant pressure controls, etc. are set in a heating mode, but space temperature will not be affected because the indoor condenser/evaporator unit 44 is inactive, as described further below. The refrigerant discharged by the compressor 12 through the domestic water water desuperheater/condenser 16, where it is condensed, giving up heat to the domestic water, is then diverted by the diverter valve 18, from port 24 to port 26. Refrigerant from diverter valve 18 flows through the second liquid conduit/suction conduit heat exchanger 72. Even with appreciable liquid refrigerant subcooling, compressor pumping capacity and charge stability may be maintained utilizing the latter in the priority domestic water mode.

The liquid then flows through the liquid conduit 58 and the restrictor or capillary tube 54, and serially arranged restrictor or capillary tube 56, to the outdoor evaporator/condenser 46 where the refrigerant evaporates, absorbing heat. Excess liquid refrigerant is allowed to flow through liquid conduits 58, 60 and capillaries 52, 50 to the now inactive indoor evaporator/condenser 44 for temporary storage.

Refrigerant vapor exits the outdoor evaporator/condenser unit 46 and flows through the the reversing valve 30 from port 40 to port 38 and returns to the compressor 12 via the suction accumulator 68, second heat exchanger 72 and compressor suction conduit 74.

As the demand for domestic hot water is satisfied, the diverter valve 18 is reversed, returning the refrigerant circuit to the normal space heating mode illustrated in FIG. 2. Excess refrigerant stored in the indoor evaporator/condenser 44 then returns to the active refrigerant circuit. Excessive refrigerant head pressure in this mode may be regulated by cycling the diverter valve 18 at determined levels by means of pressure controls (not shown), venting refrigerant to the cooling refrigerant cycle.

When heating domestic water, desired refrigerant condensing temperature, and therefore pressure, is higher than that required when rejecting heat to space in normal modes. The serially arranged capillaries 50 and 52 provide the required restriction to condense refrigerant in the desuperheater/condenser 16 at the desired pressure and temperature while maintaining the indoor evaporator/condenser 44 at proper evaporating conditions. Higher compressor discharge temperatures result from higher compression ratios as the pressure differential between the evaporator 44 and condenser 16 increases. Also, as the pressure differential between the evaporator 44 and condenser 16 increases, the capacity of compressor 12 and refrigerant mass flow decrease.

In order to heat domestic water on priority demand without affecting space temperature when controls are otherwise set in a cooling mode, the refrigerant circuit and valving are set as described in the fifth mode with reference to FIG. 4.

Figure 5:
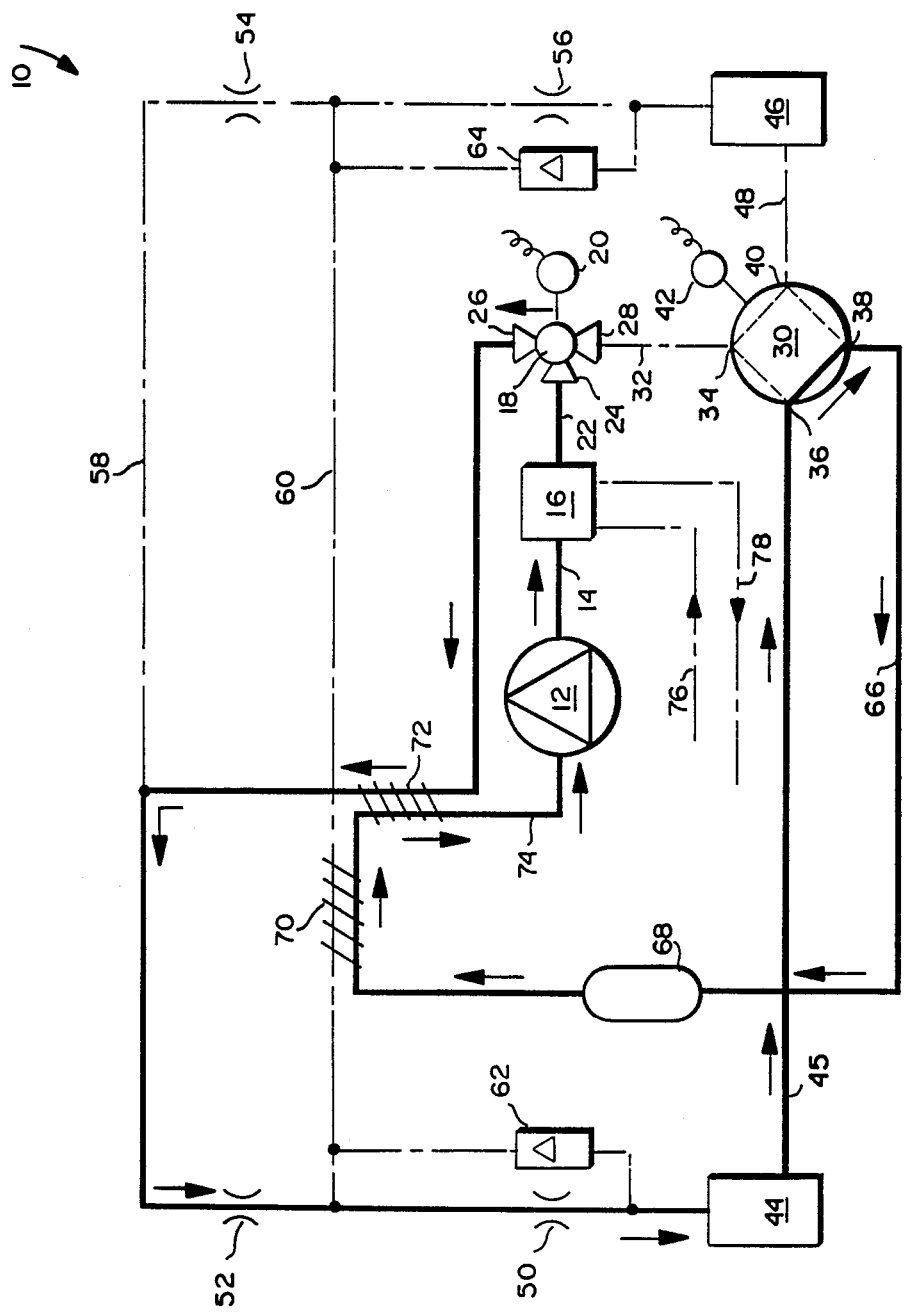
FIG. 5 is a schematic diagram of the refrigeration circuit illustrated in FIG. 1 and wherein the flow of refrigerant in a water heating priority mode (with controls otherwise set in a cooling mode) is shown in solid lines.

FIG. 5 is an illustration of an alternative circuit utilized to simultaneously cool a space and heat domestic water in a sixth mode. In this alternative arrangement, the domestic water is heated by condensation of refrigerant vapor in the desuperheater/condenser rather than by desuperheating as described above in conjunction with the fourth mode. This mode is generally similar to the fifth mode (priority heating domestic water) but with opposite flow vis-a-vis the indoor and outdoor condenser/evaporators 44, 46 respectively. Full system space cooling capacity is realized with all heat rejected to the domestic water.

As previously noted, when heating domestic water, desired refrigerant condensing temperature and therefore pressure is higher than that required when rejecting heat to space in normal modes. The serially arranged capillaries 50 and 52 with reference to the sixth mode FIG. 5 or 54 and 56 with reference to the fifth mode FIG. 4 provide the required restriction to condense refrigerant in the desuperheater/condenser 16 at the desired pressure and temperature while maintaining the respectively proper evaporating conditions. Higher compressor discharge temperatures result from higher compression ratios as the pressure difference between the evaporator and condenser increases. Also, as the pressure differential between the evaporator and condenser increases, the capacity of the compressor and refrigerant mass flow decrease. Excessive refrigerant head pressure in this mode may be regulated by cycling the diverter valve 18 at determined levels by means of pressure controls (not shown) venting refrigerant to the cooling or heating refrigerant cycles. Excess liquid refrigerant is stored in the inactive evaporator/condenser 44 FIG. 4, or 46 FIG. 5.

In either case, as the demand for domestic hot water is satisfied, the diverter valve 18 is reversed, returning cycle to the normal space heating or cooling mode. Excess liquid refrigerant stored in the respective inactive evaporator/condenser then returns to the active refrigerant circuit.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A refrigeration circuit for use in a space cooling and heating and liquid heating system comprising an indoor evaporator/condenser unit having first and second flow connections; an outdoor evaporator/condenser unit having first and second flow connections; a compressor having an inlet and an outlet; an accumulator; a pair of series arranged heat exchangers; a desuperheater/condenser unit having an inlet and an outlet; and valve means for directing refrigerant flow in different operating modes including:

(a) a first mode wherein the outlet of the compressor is connected to the inlet of the desuperheater/condenser; the outlet of the desuperheater/condenser is operatively connected to the first flow connection of the indoor evaporator/condenser unit; the second flow connection of the indoor evaporator/condenser unit is operatively connected to a first of said heat exchangers, and said first of said heat exchangers is operatively connected to the first flow connection of the outdoor evaporator/condenser unit; and the second flow connection of the outdoor evaporator/condenser is operatively connected to the accumulator and to the inlet of the compressor, and wherein refrigerant vapor is condensed in said indoor evaporator/condenser unit to thereby heat a space;

(b) a second mode wherein the liquid is diverted into said desuperheater/condenser while the refrigerant flows in a path corresponding to that in said first mode to thereby simultaneously heat the liquid by desuperheating and heat the space;

(c) a third mode wherein the outlet of the compressor is connected to the inlet of the desuperheater/condenser; the outlet of the desuperheater/condenser is operatively connected to the second flow connection of the outdoor evaporator/condenser unit; the first flow connection of the outdoor evaporator/condenser unit is operatively connected said first of said heat exchangers, and said first of said heat exchangers is operatively connected to the second flow connection of the indoor evaporator/condenser unit; and the first flow connection of said one of said heat exchangers is operatively connected to the inlet of the indoor evaporator/condenser unit; and the outlet of the indoor evaporator/condenser unit is operatively connected to the accumulator and to the inlet of the compressor, and wherein liquid-refrigerant is evaporated in said indoor evaporator/condenser to thereby cool said space;

(d) a fourth mode wherein the liquid is diverted into said desuperheater/condenser while the refrigerant flows in a path corresponding to that in said third mode, to thereby simultaneously heat the liquid by desuperheating and cool the space; and (e) a fifth mode wherein the outlet of the compressor is connected to the inlet of the desuperheater condenser; the outlet of the desuperheater/condenser is operatively connected to the outdoor evaporator/condenser units, to the accumulator, and to the inlet of the compressor, and wherein refrigerant vapor discharged from said compressor is condensed in said desuperheater/condenser to thereby transfer heat to liquid passing through said desuperheater/condenser; and further wherein said indoor and outdoor evaporator/condenser units are inoperative to affect air temperature of said space.

2. A refrigeration circuit as defined in claim 1 and wherein, in an alternative, sixth mode, the outlet of the compressor is connected to the inlet of the desuperheater/condenser; the outlet of the desuperheater/condenser is operatively connected to the second flow connection of the indoor evaporator/condenser; and the first flow connection of the indoor evaporator condenser is operatively connected to said accumulator, a second of said heat exchangers, and the inlet of the compressor, and wherein refrigerant vapor is condensed in said desuperheater/condenser to thereby transfer heat to a liquid passing through said desuperheater/condenser, and further wherein liquid refrigerant is evaporated in said indoor evaporator/condenser unit to thereby simultaneously cool said space.

3. A refrigeration circuit as defined in claim 1 and wherein said accumulator lies upstream of said first and second heat exchangers, and said first and second heat exchangers lie upstream of said compressor in one direction of refrigerant flow.

4. A refrigeration circuit as defined in claim 1 wherein said valve means includes a multi-port diverter valve connected at a first port to the outlet of the desuperheater condenser; and a multi-port reversing valve having one port thereof connected to a second port of said diverter valve.

5. A refrigeration circuit as defined in claim 4 wherein said reversing valve includes second, third and fourth ports, said second port connected to said first flow connection of said indoor evaporator/condenser unit, said third port connected to said second flow connection of said outdoor evaporator/condenser unit, and said fourth port connected to said inlet of said compressor.

6. A refrigeration circuit as defined in claim 4 wherein said diverter valve includes a third port connectable to either of said first flow connection of said indoor evaporator/condenser unit or said second flow connection of said outdoor evaporator/condenser unit.

7. A refrigeration circuit as defined in claim 5 wherein said diverter valve includes a third port connectable to either of said first flow connection of said indoor evaporator/condenser unit or said second flow connection of said outdoor evaporator/condenser unit.

8. A refrigeration circuit as defined in claim 7 and further wherein said accumulator is located between said fourth reversing valve port and said inlet port of said compressor.

9. A refrigeration circuit as defined in claim 8 and further wherein said pair of series arranged heat exchangers are located between said accumulator and said inlet port of said compressor, relative to refrigerant flow into said compressor.

10. A refrigeration circuit as defined in claim 1 and wherein said liquid comprises domestic water.

11. A refrigeration circuit as defined in claim 9 and wherein a pair of series arranged refrigerant flow restrictors are operatively associated with each of the indoor evaporator/condenser and outdoor evaporator/condenser units.

12. A refrigeration circuit as defined in claim 11 and wherein, in said first and second modes, liquid refrigerant from said indoor evaporator/condenser unit flows through said first of said heat exchangers and a first of the pair of series arranged restrictors associated with the outdoor evaporator/condenser unit.

13. A refrigeration circuit as defined in claim 11 and wherein, in said third and fourth modes, liquid refrigerant from said outdoor evaporator/condenser unit flows through said first of said heat exchangers and a first of the pair of series arranged restrictors associated with the indoor evaporator/condenser unit.

14. A refrigeration circuit as defined in claim 11 and wherein, in said fifth mode, liquid refrigerant from the desuperheater/condenser flows through said second of said exchangers and both of a pair of series arranged restrictors associated with the outdoor evaporator/condenser units.

15. A refrigeration circuit as defined in claim 11 and wherein, in said sixth mode, liquid refrigerant from said desuperheater/condenser passes through said second of said heat exchangers and a first and second of a pair of series arranged restrictors associated with said indoor evaporator/condenser unit.

16. A refrigeration circuit as defined in claim 12 and wherein, in said first and second modes, liquid refrigerant from said indoor evaporator/condenser unit bypasses the pair of series arranged restrictors associated with the indoor evaporator/condenser unit via diversion through a first check valve.

17. A refrigeration circuit as defined in claim 13 wherein, in said third and fourth modes, liquid refrigerant from said outdoor evaporator/condenser unit bypasses the pair of series arranged restrictors associated with said outdoor evaporator/condenser unit via diversion through a second check valve.

18. In a refrigeration circuit for use in a liquid heating, and space heating and cooling system which includes a compressor, a desuperheater/condenser, an indoor evaporator/condenser unit, an outdoor evaporator/condenser unit, an accumulator, first and second liquid conduit/suction conduit heat exchangers, and flow control means, the improvement comprising a pair of series arranged refrigerant flow restrictors associated with each of said indoor and outdoor evaporator/condenser units, and valve means for selectively directing refrigerant flow through one or both series arranged restrictors of one or the other of said pair of restrictors, depending on a selected mode of operation.

19. A refrigeration circuit as defined in claim 18 wherein first and second check valves are provided to cause refrigerant flow to bypass said restrictors when said flow is in a direction out of either of said indoor and outdoor evaporator/condenser units, respectively.

20. A refrigeration circuit as defined in claim 19 wherein, in a hot liquid priority demand mode of operation, said flow control means is operative to direct refrigerant, condensed in said desuperheater/condenser, in sequence, through the pair of flow restrictors associated with said outdoor evaporator/condenser unit, the accumulator, one of said liquid conduit/suction conduit heat exchangers, and to said compressor.

21. A refrigeration circuit as defined in claim 20 wherein, in an alternative mode of operation, said flow control means is operative to direct refrigerant, condensed in said desuperheater/condenser, in sequence, through the pair of flow restrictors associated with said indoor evaporator/condenser unit, the accumulator, one of said liquid conduit/suction conduit heat exchangers, and to said compressor.

22. A refrigeration circuit as defined in claim 19 wherein, in a space heating mode of operation, said flow control means is operative to direct refrigerant vapor, desuperheated in said desuperheater/condenser, in sequence, through said indoor evaporator/condenser unit, through said first check valve, the other of said liquid conduit/suction conduit heat exchangers, one of said pair of restrictors associated with said outdoor evaporator/condenser units, said outdoor evaporator condenser unit, said accumulator, said other of said liquid conduit/suction conduit heat exchangers, to said compressor.

23. A refrigeration circuit as defined in claim 19 wherein, in a space cooling mode of operation, said flow control means is operative to direct refrigerant vapor, desuperheated in said desuperheater/condenser, in sequence, through said outdoor evaporator/condenser unit, through said first check valve, the other of said liquid conduit/suction conduit heat exchangers, one of said pair of restrictors associated with said indoor evaporator/condenser units, said outdoor evaporator condenser unit, said accumulator, said other of said liquid conduit/suction conduit heat exchangers, to said compressor.

24. A refrigeration circuit as defined in claim 22 and wherein liquid is simultaneously heated in said desuperheater/condenser.

25. A refrigeration circuit as defined in claim 23 and wherein liquid is simultaneously heated in said desuperheater/condenser.

26. In a refrigeration circuit for use in a liquid heating, and space heating and cooling system which includes a compressor, a desuperheater/condenser, an indoor evaporator/condenser unit, an outdoor evaporator/condenser unit, an accumulator, first and second liquid conduit/suction conduit heat exchangers, and flow control means, the improvement comprising a pair of refrigerant flow restrictors associated with each of said indoor and outdoor evaporator/condenser units, and valve means for directing refrigerant flow through one or both of each pair of restrictors, and wherein first and second check valves are provided to cause refrigerant flow to bypass said restrictors when said flow is in a direction out of either of said indoor and outdoor evaporator/condenser units, respectively.

27. A refrigeration circuit as defined in claim 26 wherein, in a hot liquid priority demand mode of operation, said flow control means is operative to direct refrigerant, condensed in said desuperheater/condenser, in sequence, through the pair of flow restrictors associated with said outdoor evaporator/condenser unit, the accumulator, one of said liquid conduit/suction conduit heat exchangers, and to said compressor.

28. A refrigeration circuit as defined in claim 27 wherein, in an alternative mode of operation, said flow control means is operative to direct refrigerant, condensed in said desuperheater/condenser, in sequence, through the pair of flow restrictors associated with said indoor evaporator/condenser unit, the accumulator, one of said liquid conduit/suction conduit heat exchangers, and to said compressor.

29. A refrigeration circuit as defined in claim 26 wherein, in a space heating mode of operation, said flow control means is operative to direct refrigerant vapor, desuperheated in said desuperheater/condenser, in sequence, through said indoor evaporator/condenser unit, through said first a check valve, the other of said liquid conduit/suction conduit heat exchangers, one of said pair of restrictors associated with said outdoor evaporator/condenser units, said outdoor evaporator condenser unit, said accumulator, said other of said liquid conduit/suction conduit heat exchangers, to said compressor.

30. A refrigeration circuit as defined in claim 26 wherein, in a space cooling mode of operation, said flow control means is operative to direct refrigerant vapor, desuperheated in said desuperheater/condenser, in sequence, through said outdoor evaporator/condenser unit, through said first check valve, the other of said liquid conduit/suction conduit heat exchangers, one of said pair of restrictors associated with said indoor evaporator/condenser units, said outdoor evaporator/condenser unit, said accumulator, said other of said liquid conduit/suction heat exchangers, to said compressor.

31. A refrigeration circuit as defined in claim 29 and wherein liquid is simultaneously heated in said desuperheater/condenser.

32. A refrigeration circuit as defined in claim 30 and liquid is simultaneously heated in said desuperheater/condenser.

* * * * *